(12) United States Patent
Zhang et al.

(10) Patent No.: US 11,005,740 B2
(45) Date of Patent: May 11, 2021

(54) DATA TRANSMISSION METHOD, DEVICE, AND NETWORK SYSTEM

(71) Applicant: Huawei Technologies Co., Ltd., Guangdong (CN)

(72) Inventors: Daliang Zhang, Shanghai (CN); Zhiyuan Chu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/232,936

(22) Filed: Dec. 26, 2018

(65) Prior Publication Data

US 2019/0132226 A1 May 2, 2019

Related U.S. Application Data

(63) Continuation of application No. PCT/CN2016/087984, filed on Jun. 30, 2016.

(51) Int. Cl.
*H04L 12/26* (2006.01)
*H04W 76/10* (2018.01)
(Continued)

(52) U.S. Cl.
CPC .............. *H04L 43/08* (2013.01); *H04W 24/08* (2013.01); *H04W 48/18* (2013.01); *H04W 76/10* (2018.02); *H04W 48/20* (2013.01)

(58) Field of Classification Search
CPC ...... H04L 43/08; H04W 76/10; H04W 24/08; H04W 48/18; H04W 48/20
See application file for complete search history.

(56) References Cited

U.S. PATENT DOCUMENTS 7,363,047 B2 * 4/2008 Yi .......................... H04W 76/10
455/515
7,826,482 B1 11/2010 Minei et al.
(Continued)

FOREIGN PATENT DOCUMENTS

CN 101500213 A 8/2009
CN 102045148 A 5/2011
(Continued)

OTHER PUBLICATIONS

3GPP TR 23.714 V14.0.0 (Jun. 2016), "3rd Generation Partnership Project; Technical Specification Group Services and System Aspects; Study on control and user plane separation of EPC nodes (Release 14)," Technical Report, Jun. 2016, 87 pages.
(Continued)

*Primary Examiner* — Jenee Holland
*Assistant Examiner* — Latresa A McCallum
(74) *Attorney, Agent, or Firm* — Fish & Richardson P.C.

(57) ABSTRACT

A method includes: obtaining, by a control plane device, quality of service (QoS) required by a data transmission service and information about data transmission capabilities of at least two user plane devices controlled by the control plane device; after determining that a data transmission service needs to be established between a terminal and a user plane device, selecting, from the at least two user plane devices, a user plane device whose data transmission capability satisfies the QoS required by the data transmission service; and establishing a bearer of the data transmission service on the selected user plane device.

6 Claims, 4 Drawing Sheets

(51) Int. Cl.
*H04W 24/08* (2009.01)
*H04W 48/18* (2009.01)
*H04W 48/20* (2009.01)

(56) References Cited

U.S. PATENT DOCUMENTS

| | | |
|---|---|---|
| 2010/0195503 A1 | 8/2010 | Raleigh |
| 2012/0076042 A1 | 3/2012 | Chun et al. |
| 2012/0230248 A1 | 9/2012 | Gao et al. |
| 2013/0157679 A1* | 6/2013 | Van Phan .............. H04W 76/14 |
| | | 455/452.2 |
| 2015/0229424 A1 | 8/2015 | Moynihan et al. |
| 2016/0205693 A1 | 7/2016 | Lu et al. |
| 2016/0286376 A1* | 9/2016 | Yu ........................... H04W 8/02 |
| 2017/0265063 A1 | 9/2017 | Xie et al. |

FOREIGN PATENT DOCUMENTS

| | | |
|---|---|---|
| CN | 102450079 A | 5/2012 |
| CN | 102523570 A | 6/2012 |
| CN | 104349372 A | 2/2015 |
| CN | 105491557 A | 4/2016 |
| CN | 107006014 A | 8/2017 |
| EP | 2854475 A1 | 4/2015 |
| EP | 3445128 A1 | 2/2019 |
| WO | 2015043395 A1 | 4/2015 |
| WO | 2016091293 A1 | 6/2016 |

OTHER PUBLICATIONS

Extended European Search Report issued in European Application No. 16906763.4 dated May 29, 2019, 8 pages.
Office Action issued in Chinese Application No. 201680086978.1 dated Mar. 3, 2020, 17 pages (with English translation).
EPO Communication to Article 94(3) issued in European Application No. 16906763.4 dated May 25, 2020, 5 pages.
Office Action issued in Chinese Application No. 201680086978.1 dated Dec. 1, 2020, 8 pages.

* cited by examiner

DATA TRANSMISSION METHOD, DEVICE, AND NETWORK SYSTEM

CROSS-REFERENCE TO RELATED APPLICATIONS

This application is a continuation of International Application No. PCT/CN2016/087984 filed on Jun. 30, 2016, the disclosure of which is hereby incorporated by reference in its entirety.

TECHNICAL FIELD

The present application relates to the field of wireless communications technologies, and in particular, to a data transmission method, a device, and a network system.

BACKGROUND

In recent years, with development of communications technologies, various wireless communications technologies such as LTE (Long Term Evolution), 3G (3rd-Generation, 3rd generation mobile communications technology), WiMAX (Worldwide Interoperability for Microwave Access), WLAN (Wireless Local Area Networks), and ZigBee emerge in an endless stream, bringing convenience to people's lives.

With approach of the age of mobile new media, a higher requirement is imposed to QoS (quality of service) of a data transmission service. However, in an existing communications technology, when QoS required by an established data transmission service exceeds a bearer capability of a device, a data transmission requirement cannot be satisfied.

In conclusion, there is a relatively high probability that a bearer capability of a device in the prior art limits a data transmission service.

SUMMARY

The present application provides a data transmission method, a device, and a network system, to resolve a problem of a relatively high probability that a bearer capability of a device in the prior art limits a data transmission service.

According to a first aspect, a data transmission method is provided. The method includes:

obtaining, by a control plane device, quality of service (QoS) required by a data transmission service and information about data transmission capabilities of at least two user plane devices controlled by the control plane device; after determining that a data transmission service needs to be established between a terminal and a user plane device, selecting, from the at least two user plane devices, a user plane device whose data transmission capability satisfies the QoS required by the data transmission service; and establishing a bearer of the data transmission service on the selected user plane device.

In this embodiment of the present application, the control plane device controls at least two user plane devices, and the control plane device may select, from the at least two user plane devices, a user plane device whose data transmission capability satisfies the QoS required by the data transmission service, so that when the QoS required by the established data transmission service exceeds data transmission capabilities of some of the at least two user plane devices, the bearer of the data transmission service may be established on the user plane device whose data transmission capability satisfies the QoS required by the data transmission service. Therefore, a probability in the prior art that data transmission is limited when the control plane controls only one user plane device, and a data transmission capability of the user plane device cannot satisfy the QoS required by the transmission service. In addition, because functions of the control plane device and the user plane device are separated, when none of the user plane devices controlled by the control plane device can satisfy the requirement of the data transmission service, a new user plane device may be added to satisfy the requirement of the data transmission service.

Based on the first aspect, optionally, the control plane device sends a notification instructing to establish the bearer of the data transmission service to the selected user plane device, and the notification is used to indicate resource information that needs to be reserved by the selected user plane device.

Based on the first aspect, optionally, after sending the notification instructing to establish the bearer of the data transmission service to the selected user plane device, the control plane device receives a response that indicates that the establishment of the bearer of the data transmission service is complete and that is sent by the selected user plane device, to determine that the establishment of the bearer of the data transmission service is complete.

Based on the first aspect, optionally, the control plane device and the at least two user plane devices controlled by the control plane device are located on one physical entity; or the control plane device and the at least two user plane devices controlled by the control plane device are respectively located on different physical entities; or the control plane device and at least one of the at least two user plane devices controlled by the control plane device are located on a same physical entity, and the control plane device and a user plane device other than the at least one user plane device are located on different physical entities.

Based on the first aspect, optionally, if the selected user plane device and the control plane device are respectively located on different physical entities, the control plane device selects, from the at least two user plane devices, a user plane device whose data transmission capability satisfies the QoS required by the data transmission service and that is located on a physical entity different from a physical entity on which the control plane device is located.

According to a second aspect, a data transmission method is provided. The method includes:

obtaining, by a user plane device, data transmission capability information of the user plane device; and sending the data transmission capability information to a control plane device.

Based on the second aspect, optionally, after sending the data transmission capability information to the control plane device, the user plane device receives a notification that instructs to establish a bearer of a data transmission service and that is sent by the control plane device, and reserves, based on the notification, resource information for the data transmission service that needs to be established, and the notification is used to indicate the resource information that needs to be reserved by the user plane device.

Based on the second aspect, optionally, after reserving the resource information for the data transmission service that needs to be established, the user plane device sends a response indicating that the establishment of the bearer of the data transmission service is complete to the control plane device.

According to a third aspect, a network system is provided. The network system includes a control plane device and at least two user plane devices controlled by the control plane device, where the control plane device is configured to: obtain quality of service QoS required by a data transmission service and information about data transmission capabilities of the at least two user plane devices controlled by the control plane device, and after determining that a data transmission service needs to be established between a user plane device and a terminal, select, from the at least two user plane devices, a user plane device whose data transmission capability satisfies the QoS required by the data transmission service, and establish a bearer of the data transmission service on the selected user plane device; and the user plane device is configured to: obtain the data transmission capability information of the user plane device, and send the data transmission capability information to the control plane device.

Based on the third aspect, optionally, when establishing the bearer of the data transmission service on the selected user plane device, the control plane device is specifically configured to send a notification instructing to establish the bearer of the data transmission service to the selected user plane device, and the notification is used to indicate resource information that needs to be reserved by the selected user plane device; and the selected user plane device is further configured to: receive the notification that instructs to establish the bearer of the data transmission service and that is sent by the control plane device, and reserve, based on the notification, the resource information for the data transmission service that needs to be established.

Based on the third aspect, optionally, the selected user plane device is further configured to send a response indicating that the establishment of the bearer of the data transmission service is complete to the control plane device; and the control plane device is further configured to receive the response that indicates that the establishment of the bearer of the data transmission service is complete and that is sent by the selected user plane device, to determine that the establishment of the bearer of the data transmission service is complete.

Based on the third aspect, optionally, the control plane device and the at least two user plane devices controlled by the control plane device are located on one physical entity; or the control plane device and the at least two user plane devices controlled by the control plane device are respectively located on different physical entities; or the control plane device and at least one of the at least two user plane devices controlled by the control plane device are located on a same physical entity, and the control plane device and a user plane device other than the at least one user plane device are located on different physical entities.

Based on the third aspect, optionally, if the selected user plane device and the control plane device are respectively located on different physical entities, the control plane device selects, from the at least two user plane devices, a user plane device whose data transmission capability satisfies the QoS required by the data transmission service and that is located on a physical entity different from a physical entity on which the control plane device is located.

According to a fourth aspect, a control plane device for data transmission is provided. The control plane device includes a processing unit and a transceiver unit. The transceiver unit is configured to obtain quality of service QoS required by a data transmission service and information about data transmission capabilities of at least two user plane devices controlled by the device. The processing unit is configured to: after determining that a data transmission service needs to be established between a terminal and a user plane device, select, from the at least two user plane devices, a user plane device whose data transmission capability satisfies the QoS required by the data transmission service, and establish a bearer of the data transmission service on the selected user plane device.

Based on the fourth aspect, optionally, the control plane device and the at least two user plane devices controlled by the control plane device are located on one physical entity; or the control plane device and the at least two user plane devices controlled by the control plane device are respectively located on different physical entities; or the control plane device and at least one of the at least two user plane devices controlled by the control plane device are located on a same physical entity, and the control plane device and a user plane device other than the at least one user plane device are located on different physical entities.

Based on the fourth aspect, optionally, if the selected user plane device and the control plane device are respectively located on different physical entities, when selecting, from the at least two user plane devices, the user plane device whose data transmission capability satisfies the QoS required by the data transmission service, the processing unit is specifically configured to:

select, from the at least two user plane devices, a user plane device whose data transmission capability satisfies the QoS required by the data transmission service and that is located on a physical entity different from a physical entity on which the device is located.

According to a fifth aspect, a user plane device for data transmission is provided. The user plane device includes a processing unit and a transceiver unit. The processing unit is configured to obtain data transmission capability information of the user plane device; and the transceiver unit is configured to send the data transmission capability information to a control plane device.

According to a sixth aspect, a control plane device for data transmission is provided. The control plane device includes a processor, a transceiver, and a memory. The memory is configured to store data that needs to be transmitted and a program executed by the processor to perform the data transmission technical solution according to any design of the first aspect; the transceiver is configured to receive and send data that needs to be transmitted; and the processor is configured to execute the program of the data transmission technical solution according to any design of the first aspect.

According to a seventh aspect, a chip for data transmission is provided. The chip includes an input/output interface, at least one processor, a memory, a bus, and the like. The input/output interface, the at least one processor, and the memory are connected to each other by using the bus; the memory is configured to store data that needs to be transmitted and a program executed by the processor to perform the technical solution according to any design of the first aspect; the input/output interface is configured to receive and send the data that needs to be transmitted; and the processor is configured to execute the program of the data transmission technical solution according to any design of the first aspect.

According to an eighth aspect, a computer-readable storage medium is provided. The computer-readable storage medium is configured to store a computer software instruction used to perform the technical solution according to any design of the first aspect, and the computer software instruction includes a program designed to perform the technical solution according to any design of the first aspect.

According to a ninth aspect, a user plane device for data transmission is provided. The user plane device includes a processor, a transceiver, and a memory. The memory is configured to store data that needs to be transmitted and a program executed by the processor to perform the data transmission technical solution according to any design of the second aspect; the transceiver is configured to receive and send data that needs to be transmitted; and the processor is configured to execute the program of the data transmission technical solution according to any design of the second aspect.

According to a tenth aspect, a chip for data transmission is provided. The chip includes an input/output interface, at least one processor, a memory, a bus, and the like. The input/output interface, the at least one processor, and the memory are connected to each other by using the bus; the memory is configured to store data that needs to be transmitted and a program executed by the processor to perform the technical solution according to any design of the second aspect; the input/output interface is configured to receive and send the data that needs to be transmitted; and the processor is configured to execute the program of the data transmission technical solution according to any design of the second aspect.

According to an eleventh aspect, a computer-readable storage medium is provided. The computer-readable storage medium is configured to store a computer software instruction used to perform the technical solution according to any design of the second aspect, and the computer software instruction includes a program designed to perform the technical solution according to any design of the second aspect.

DETAILED DESCRIPTION

To make the objectives, technical solutions, and advantages of this application clearer, the following further describes this application in detail with reference to the accompanying drawings.

Figure 1:
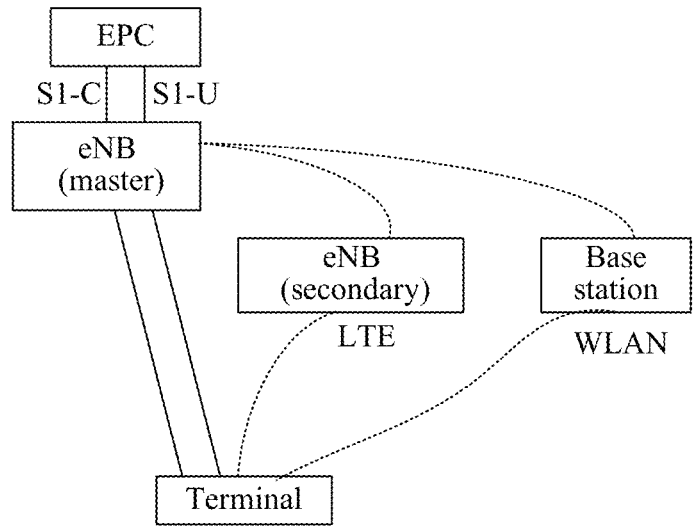
FIG. 1 is a schematic diagram of a multi-node user plane data splitting scenario in the prior art.

It should be understood that embodiments of the present application may be applied to a multi-node user plane data splitting scenario shown in FIG. 1. A master eNB (evolved NodeB) is connected to an EPC (evolved packet core). An S1-C is a control plane interface, an S1-U is a user plane interface, and a secondary eNB and a WLAN base station are nodes after data of a user plane is split. Data may be sent to a terminal by separately using the master eNB, the secondary eNB, and the WLAN base station, to improve a data transmission rate.

However, due to a limitation of a hardware capability of the master eNB, a data transmission service can be established on only a user plane of the master eNB, easily causing a limitation to data transmission such as a peak throughput rate.

Figure 2:
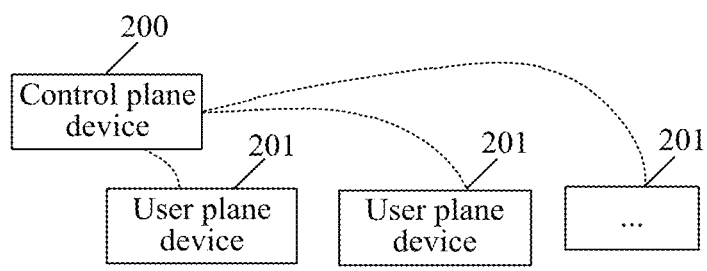
FIG. 2 is a schematic diagram of a network system according to an embodiment of the present application.

As shown in FIG. 2, a network system according to an embodiment of the present application includes a control plane device 200 and at least two user plane devices 201 controlled by the control plane device. The control plane device 200 is configured to: obtain QoS required by a data transmission service and information about data transmission capabilities of the at least two user plane devices 201 controlled by the control plane device 200, and after determining that a data transmission service needs to be established between the user plane device 201 and a terminal, select, from the at least two user plane devices 201, the user plane device 201 whose data transmission capability satisfies the QoS required by the data transmission service, and establish a bearer of the data transmission service on the selected user plane device 201. The user plane device 201 is configured to: obtain the data transmission capability information of the user plane device 201, and send the data transmission capability information to the control plane device 200.

It should be understood that the QoS in this embodiment of the present application includes a peak throughput rate of data transmission, and the like, and the data transmission capability information of the user plane device is capability information that can still be used for data transmission and that is of the user plane device. The control plane device obtains the QoS required by the data transmission service from the terminal.

The user plane device obtains the data transmission capability information of the user plane device. Specifically, the user plane device may periodically obtain the data transmission capability information of the user plane device, and then send the data transmission capability information to the control plane device, and the control plane device periodically receives the data transmission capability information of the user plane device. A period of the user plane device is the same as a period of the control plane device. Alternatively, the user plane device may obtain the data transmission capability information of the user plane device in real time, and then send the data transmission capability information to the control plane device, and the control plane device receives the data transmission capability information of the user plane device in real time.

Figure 3:
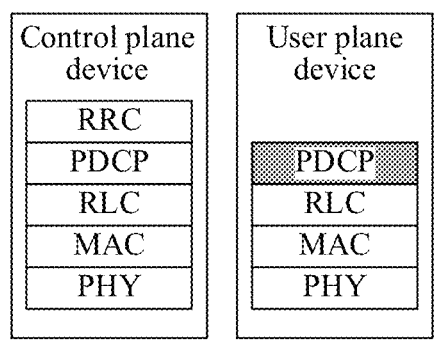
FIG. 3 is a schematic protocol stack diagram of a control plane device and a user plane device according to an embodiment of the present application.

In this embodiment of the present application, as shown in FIG. 3, a protocol stack of the control plane device 200 includes an RRC (Radio Resource Control) layer, a PDCP (Packet Data Convergence Protocol) layer, an RLC (Radio Link Control) layer, a MAC (Media Access Control) layer, and a PHY (Physical) layer. A protocol stack of the user plane device includes a PDCP layer, an RLC layer, a MAC layer, and a PHY layer. The establishing, by the control plane device, a bearer of the data transmission service on the selected user plane device is specifically establishing, by the control plane device, the bearer of the data transmission service on the PDCP layer of the selected user plane device.

An optional implementation is that the control plane device sends a notification instructing to establish the bearer of the data transmission service to the selected user plane device, and the notification is used to indicate resource information that needs to be reserved by the selected user plane device.

After receiving the notification, the user plane device reserves the resource information for the data transmission service based on the notification. It should be noted that the resource information includes but is not limited to resource storage space.

To ensure that the control plane device establishes the bearer of the data transmission service on the selected user plane device, after reserving, based on the notification, the resource information for the data transmission service that needs to be established, the selected user plane device sends a response indicating that the establishment of the bearer of the data transmission service is complete to the control plane device.

The control plane device receives the response that indicates that the establishment of the bearer of the data transmission service is complete and that is sent by the selected user plane device, to determine that the establishment of the bearer of the data transmission service is complete.

Then, the terminal may receive and send data by using the selected user plane device.

Optionally, the control plane device and the at least two user plane devices controlled by the control plane device are located on one physical entity.

For example, when two user plane devices are controlled by the control plane device, the control plane device and the two user plane devices are on one physical entity. The physical entity may be a base station or an MME (mobility management entity), or another device that can be divided into a control plane and a user plane.

Optionally, the control plane device and the at least two user plane devices controlled by the control plane device are respectively located on different physical entities.

For example, when two user plane devices are controlled by the control plane device, the control plane device and the two user plane devices are respectively located on three different physical entities.

Optionally, the control plane device and at least one of the at least two user plane devices controlled by the control plane device are located on a same physical entity, and the control plane device and a user plane device other than the at least one user plane device are located on different physical entities.

Figure 4:
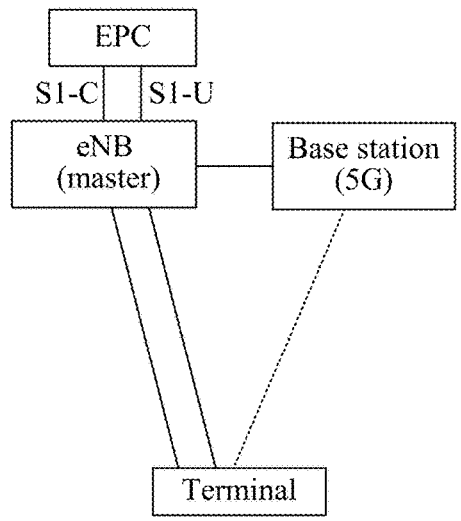
FIG. 4 is a schematic diagram of a network system according to an embodiment of the present application.

For example, when two user plane devices are controlled by the control plane device, the control plane device and one of the two user plane devices are located on one physical entity, and the control plane device and the other one of the two user plane devices are located on different physical entities. In this case, the network system may be applied to a 5G Non Standalone scenario. 5G Non Standalone is a possible state of 5G. In the 5G Non Standalone scenario, because a 5G base station cannot be directly connected to a core network, the terminal cannot camp on the 5G base station. The terminal may camp on an LTE base station according to this embodiment of the present application. When the terminal needs to establish a data transmission service with the 5G base station, the terminal may establish a bearer of the data transmission service on a user plane device of the 5G base station by using a control plane device of the LTE base station, as shown in FIG. 4.

Figure 5:
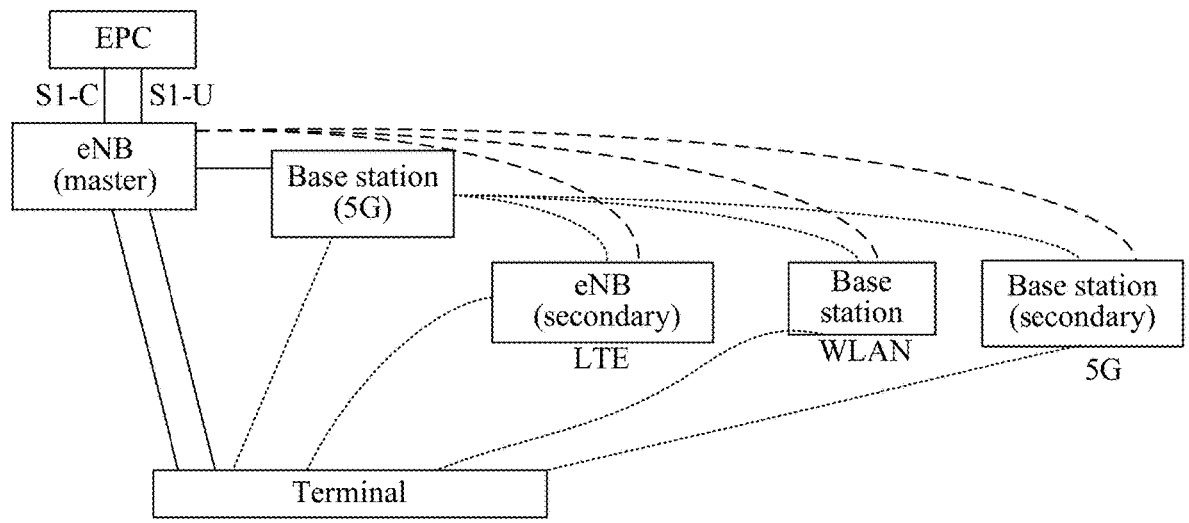
FIG. 5 is a schematic diagram of a network system applied to a multi-node user plane data splitting scenario according to an embodiment of the present application.

In addition, FIG. 5 shows a case in which the network system in this embodiment of the present application is applied to a multi-node user plane data splitting scenario.

Specifically, when determining that a data transmission service needs to be established, a control plane device of a master eNB obtains QoS required by the data transmission service. The QoS includes a peak throughput rate, and information about data transmission capabilities of a user plane device of the master eNB and a user plane device of a 5G base station connected to the master eNB. When a capability that is used for data transmission and that is of the user plane device of the master eNB does not satisfy the QoS required by the data transmission service and a capability that is used for data transmission and that is of the user plane device of the 5G base station satisfies the QoS required by the data transmission service, the control plane device establishes a bearer of the data transmission service on the user plane device of the 5G base station, so that data that needs to be transmitted is split to an LTE secondary eNB, a WLAN base station, and a 5G secondary base station by using the user plane device of the 5G base station.

Based on a same inventive concept, an embodiment of the present application further provides a data transmission method. A network system that corresponds to the data transmission method is the network system in the foregoing embodiment of the present application. Therefore, for implementation of the data transmission method according to this embodiment of the present application, refer to implementation of the network system, and repetitions are not described herein again.

Figure 6:
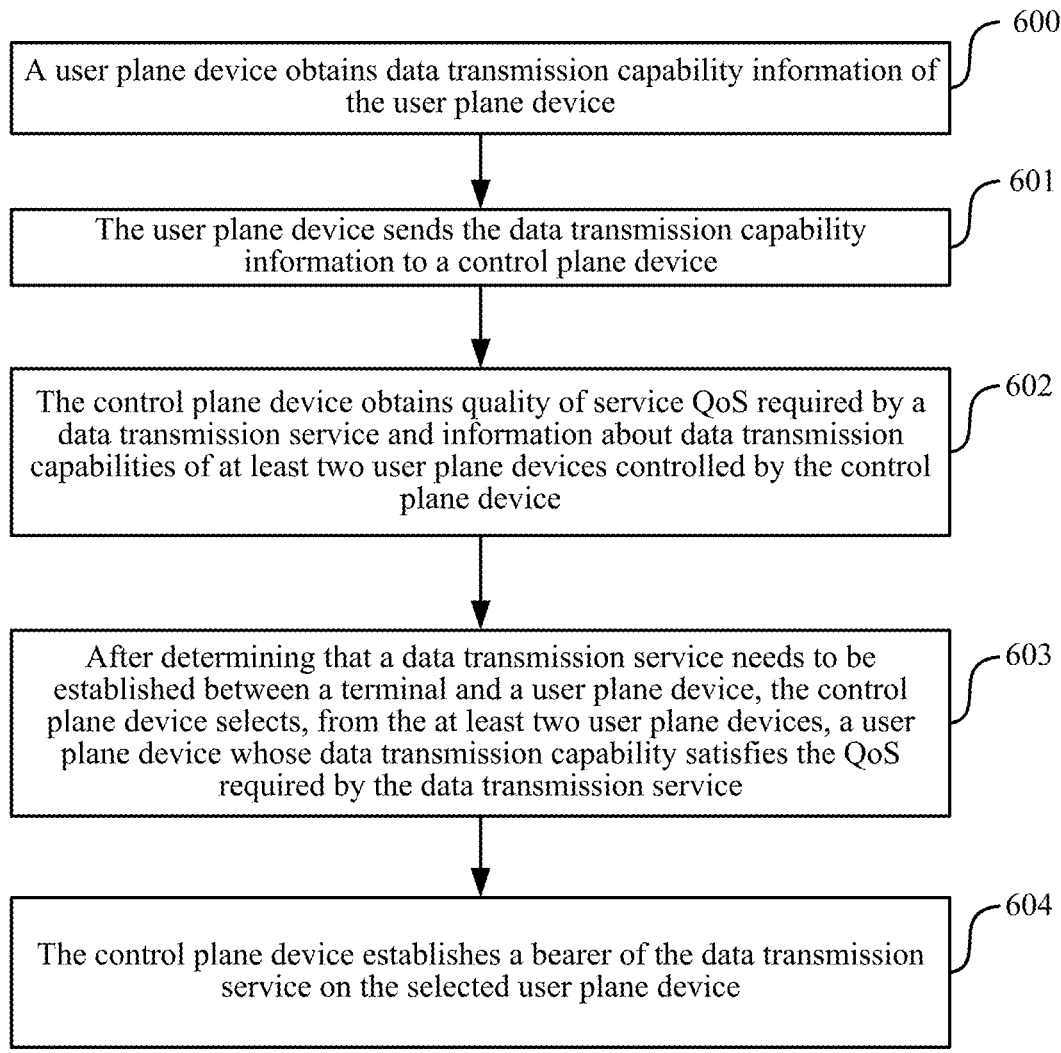
FIG. 6 is a schematic flowchart of a data transmission method according to an embodiment of the present application.

As shown in FIG. 6, a data transmission method according to an embodiment of the present application includes the following steps.

Step 600: A user plane device obtains data transmission capability information of the user plane device.

Step 601: The user plane device sends the data transmission capability information to a control plane device.

Step 602: The control plane device obtains quality of service QoS required by a data transmission service and information about data transmission capabilities of at least two user plane devices controlled by the control plane device.

Step 603: After determining that a data transmission service needs to be established between a terminal and a user plane device, the control plane device selects, from the at least two user plane devices, a user plane device whose data transmission capability satisfies the QoS required by the data transmission service.

Step 604: The control plane device establishes a bearer of the data transmission service on the selected user plane device.

Optionally, the control plane device and the at least two user plane devices controlled by the control plane device are located on one physical entity; or the control plane device and the at least two user plane devices controlled by the control plane device are respectively located on different physical entities; or the control plane device and at least one of the at least two user plane devices controlled by the control plane device are located on a same physical entity, and the control plane device and a user plane device other than the at least one user plane device are located on different physical entities.

Optionally, if the selected user plane device and the control plane device are respectively located on different physical entities, the control plane device selects, from the at least two user plane devices, a user plane device whose data transmission capability satisfies the QoS required by the data transmission service and that is located on a physical entity different from a physical entity on which the control plane device is located.

Based on a same inventive concept, an embodiment of the present application further provides a control plane device for data transmission. A network system that corresponds to the control plane device for data transmission is the network system in the foregoing embodiments of the present application. Therefore, for implementation of the control plane device for data transmission according to this embodiment of the present application, refer to implementation of the network system, and repetitions are not described herein again.

Figure 7:
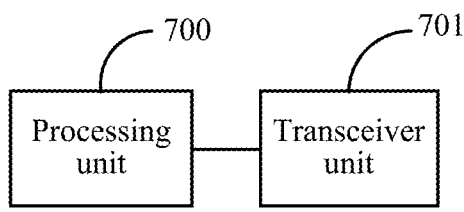
FIG. 7 is a schematic structural diagram of a control plane device for data transmission according to an embodiment of the present application.

As shown in FIG. 7, a control plane device for data transmission according to an embodiment of the present application includes a processing unit 700 and a transceiver unit 701. The transceiver unit 701 is configured to obtain quality of service QoS required by a data transmission service and information about data transmission capabilities of at least two user plane devices controlled by the device. The processing unit 700 is configured to: after determining that a data transmission service needs to be established between a terminal and a user plane device, select, from the at least two user plane devices, a user plane device whose data transmission capability satisfies the QoS required by the data transmission service, and establish a bearer of the data transmission service on the selected user plane device.

Optionally, the control plane device and the at least two user plane devices controlled by the control plane device are located on one physical entity; or the control plane device and the at least two user plane devices controlled by the control plane device are respectively located on different physical entities; or the control plane device and at least one of the at least two user plane devices controlled by the control plane device are located on a same physical entity, and the control plane device and a user plane device other than the at least one user plane device are located on different physical entities.

Optionally, if the selected user plane device and the control plane device are respectively located on different physical entities, the processing unit 700 is specifically configured to select, from the at least two user plane devices, a user plane device whose data transmission capability satisfies the QoS required by the data transmission service and that is located on a physical entity different from a physical entity on which the device is located.

Figure 8:
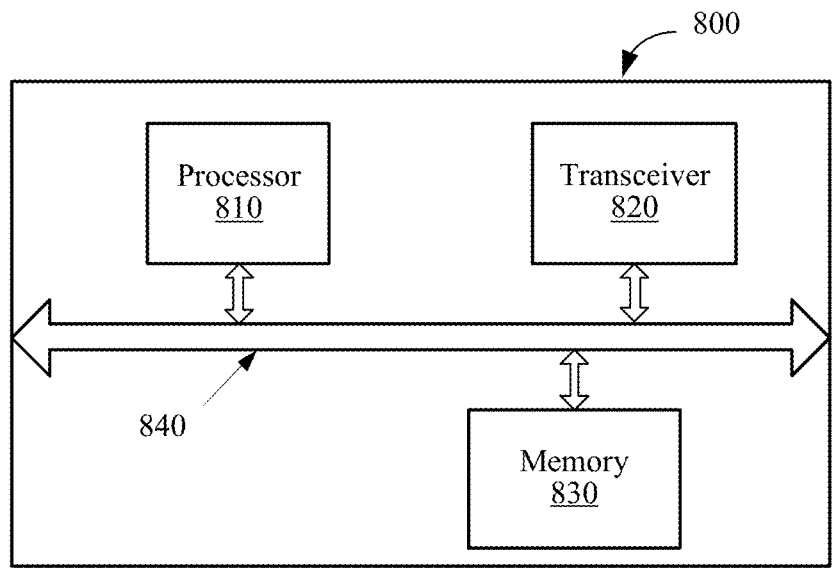
FIG. 8 is a schematic structural diagram of hardware of a control plane device for data transmission according to an embodiment of the present application.

It should be noted that in this embodiment of the present application, the processing unit 700 may be implemented by using a processor, and the transceiver unit 701 may be implemented by using a transceiver. As shown in FIG. 8, a control plane device 800 may include a processor 810, a transceiver 820, and a memory 830. The memory 830 may be configured to store a program/code pre-installed at delivery of the control plane device 800, or may store code executed by the processor 810, and the like.

Components of the control plane device 800 are coupled together by using a bus system 840. In addition to a data bus, the bus system 840 includes a power supply bus, a control bus, and a status signal bus.

The processor 810 may use a general-purpose central processing unit (CPU), a microprocessor, an application-specific integrated circuit (ASIC), or one or more integrated circuits to perform related operations, to implement the technical solution provided in this embodiment of the present application.

It should be noted that, although the control plane device 800 shown in FIG. 8 includes only the memory 810, the transceiver 820, and the memory 830, in a specific implementation process, persons skilled in the art should understand that the control plane device further includes another component that is essential for implementing normal running. In addition, based on a specific requirement, persons skilled in the art should understand that the control plane device may further include a hardware component for implementing another additional function. Moreover, persons skilled in the art should understand that the control plane device may also include only components or modules that are essential for implementing this embodiment of the present application instead of including all of the components shown in FIG. 8.

Persons of ordinary skill in the art may understand that all or some of the procedures of the methods in the foregoing embodiments may be implemented by using a computer program instructing relevant hardware. The program may be stored in a computer-readable storage medium. When the program runs, the procedures of the methods in the embodiments are performed. The foregoing storage medium may be a magnetic disk, an optical disc, a read-only memory (ROM), a random access memory (RAM), or the like.

In addition, the data transmission methods in the embodiments of the present application may further be implemented by using a chip. The chip specifically includes an input/output interface, at least one processor, a memory, a bus, and the like. The input/output interface, the at least one processor, and the memory are connected to each other by using the bus; the memory is configured to store data that needs to be transmitted and a program executed by the processor to perform the data transmission technical solutions according to the embodiments of the present application; the input/output interface is configured to receive and send the data that needs to be transmitted; and the processor is configured to execute the program of the data transmission technical solutions according to the embodiments of the present application. Specifically, the chip is embedded into a device (such as a base station) that needs to perform data transmission, so that the device has a data transmission function in the embodiments of the present application.

An embodiment of the present application further provides a computer-readable storage medium. The computer-readable storage medium is configured to store a computer software instruction used to perform the technical solutions according to the embodiments of the present application, and the computer software instruction includes a program designed to perform the technical solutions according to the embodiments of the present application.

Based on a same inventive concept, an embodiment of the present application further provides a user plane device for data transmission. A network system that corresponds to the user plane device for data transmission is the network system in the foregoing embodiments of the present application. Therefore, for implementation of the user plane device for data transmission according to this embodiment of the present application, refer to implementation of the network system, and repetitions are not described herein again.

Figure 9:
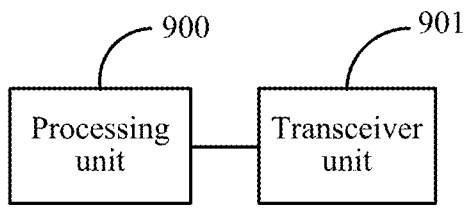
FIG. 9 is a schematic structural diagram of a user plane device for data transmission according to an embodiment of the present application.

As shown in FIG. 9, a user plane device for data transmission according to an embodiment of the present application includes a processing unit 900 and a transceiver unit 901. The processing unit 900 is configured to obtain data transmission capability information of the user plane device; and the transceiver unit 901 is configured to send the data transmission capability information to a control plane device.

Figure 10:
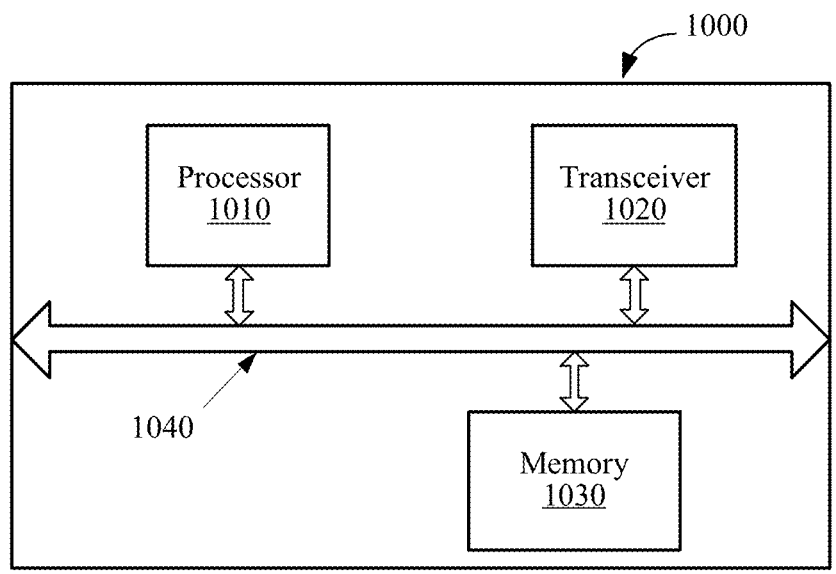
FIG. 10 is a schematic structural diagram of hardware of a user plane device for data transmission according to an embodiment of the present application.

It should be noted that in this embodiment of the present application, the processing unit 900 may be implemented by using a processor, and the transceiver unit 901 may be implemented by using a transceiver. As shown in FIG. 10, a user plane device 1000 may include a processor 1010, a transceiver 1020, and a memory 1030. The memory 1030 may be configured to store a program/code pre-installed at delivery of the user plane device 1000, or may store code executed by the processor 1010, and the like.

Components of the user plane device 1000 are coupled together by using a bus system 1040. In addition to a data bus, the bus system 1040 includes a power supply bus, a control bus, and a status signal bus.

The processor 1010 may use a general-purpose central processing unit (CPU), a microprocessor, an application-specific integrated circuit (ASIC), or one or more integrated circuits to perform related operations, to implement the technical solution provided in this embodiment of the present application.

It should be noted that, although the user plane device 1000 shown in FIG. 10 includes only the memory 1010, the transceiver 1020, and the memory 1030, in a specific implementation process, persons skilled in the art should understand that user plane device further includes another component that is essential for implementing normal running. In addition, based on a specific requirement, persons skilled in the art should understand that the user plane device may further include a hardware component for implementing another additional function. Moreover, persons skilled in the art should understand that the user plane device may also include only components or modules that are essential for implementing this embodiment of the present application instead of including all of the components shown in FIG. 10.

Persons of ordinary skill in the art may understand that all or some of the procedures of the methods in the embodiments may be implemented by using a computer program instructing relevant hardware. The program may be stored in a computer-readable storage medium. When the program runs, the procedures of the methods in the embodiments are performed. The foregoing storage medium may be a magnetic disk, an optical disc, a ROM, a RAM, or the like.

In addition, the data transmission methods in the embodiments of the present application may further be implemented by using a chip. The chip specifically includes an input/output interface, at least one processor, a memory, a bus, and the like. The input/output interface, the at least one processor, and the memory are connected to each other by using the bus; the memory is configured to store data that needs to be transmitted and a program executed by the processor to perform the data transmission technical solutions according to the embodiments of the present application; the input/output interface is configured to receive and send the data that needs to be transmitted; and the processor is configured to execute the program of the data transmission technical solutions according to the embodiments of the present application. Specifically, the chip is embedded into a device (such as a base station) that needs to perform data transmission, so that the device has a data transmission function in the embodiments of the present application.

An embodiment of the present application further provides a computer-readable storage medium. The computer-readable storage medium is configured to store a computer software instruction used to perform the technical solutions according to the embodiments of the present application, and the computer software instruction includes a program designed to perform the technical solutions according to the embodiments of the present application.

It can be learned from the foregoing content that the control plane device in the embodiments of the present application obtains the quality of service QoS required by the data transmission service and the information about data transmission capabilities of the at least two user plane devices controlled by the control plane device; after determining that the data transmission service needs to be established between the terminal and the user plane device, the control plane device selects, from the at least two user plane devices, the user plane device whose data transmission capability satisfies the QoS required by the data transmission service, and establishes the bearer of the data transmission service on the selected user plane device. In this technical solution, the control plane device is separated from the user plane device, and there are a plurality of user plane devices, so that a probability that data transmission is limited by the data transmission capability of the device is reduced.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer-readable memory that can instruct the computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing.

Therefore, the instructions executed on the computer or the another programmable device provide steps for implementing a specific function in one or more processes in the flowcharts and/or in one or more blocks in the block diagrams.

Although some embodiments of the present application have been described, persons skilled in the art can make changes and modifications to these embodiments once they learn the basic inventive concept. Therefore, the following claims are intended to be construed as to cover the embodiments and all changes and modifications falling within the scope of the present application.

Obviously, persons skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A data transmission method, comprising:
obtaining, by a control plane device, quality of service (QoS) required by a data transmission service and information about data transmission capabilities of at least two user plane devices controlled by the control plane device, wherein the QoS required by the data transmission service is obtained from a terminal;
after determining that the data transmission service needs to be established between the terminal and a user plane device, selecting, by the control plane device from the at least two user plane devices, a user plane device whose data transmission capability satisfies the QoS required by the data transmission service, wherein when the selected user plane device and the control plane device are respectively located on different physical entities, selecting, by the control plane device from the at least two user plane devices, the user plane device whose data transmission capability satisfies the QoS required by the data transmission service comprises:
selecting, by the control plane device from the at least two user plane devices, a user plane device whose data transmission capability satisfies the QoS required by the data transmission service and that is located on a physical entity different from a physical entity on which the control plane device is located; and
determining, by the control plane device, to establish a bearer of the data transmission service on the selected user plane device.

2. The method according to claim 1, wherein:
the control plane device and the at least two user plane devices controlled by the control plane device are respectively located on different physical entities; or
the control plane device and at least one of the at least two user plane devices controlled by the control plane device are located on a same physical entity, and the control plane device and a user plane device other than the at least one user plane device are located on different physical entities.

3. A network system, comprising:
a control plane device;
at least two user plane devices controlled by the control plane device;
wherein the control plane device is configured to:
obtain quality of service (QoS) required by a data transmission service and information about data transmission capabilities of the at least two user plane devices controlled by the control plane device, wherein the QoS required by the data transmission service is obtained from a terminal;
after determining that the data transmission service needs to be established between a user plane device and the terminal, select, from the at least two user plane devices, a user plane device whose data transmission capability satisfies the QoS required by the data transmission service; and
establish a bearer of the data transmission service on the selected user plane device; wherein when the selected user plane device and the control plane device are respectively located on different physical entities, when the control plane device selects, from the at least two user plane devices, the user plane device whose data transmission capability satisfies the QoS required by the data transmission service, the control plane device is configured to:
select, from the at least two user plane devices, a user plane device whose data transmission capability satisfies the QoS required by the data transmission service and that is located on a physical entity different from a physical entity on which the control plane device is located; and
wherein the selected user plane device is configured to:
obtain data transmission capability information of the user plane device, and send the data transmission capability information to the control plane device.

4. The system according to claim 3, wherein:
the control plane device and the at least two user plane devices controlled by the control plane device are respectively located on different physical entities; or
the control plane device and at least one of the at least two user plane devices controlled by the control plane device are located on a same physical entity, and the control plane device and a user plane device other than the at least one user plane device are located on different physical entities.

5. A control plane device for data transmission, comprising:
a transceiver, the transceiver configured to obtain quality of service (QoS) required by a data transmission service and information about data transmission capabilities of at least two user plane devices controlled by the control plane device, wherein the QoS required by the data transmission service is obtained from a terminal; and
at least one processor, the at least one processor configured to:
after determining that the data transmission service needs to be established between the terminal and a user plane device, select, from the at least two user plane devices, a user plane device whose data transmission capability satisfies the QoS required by the data transmission service; and
establish a bearer of the data transmission service on the selected user plane device;
wherein when the selected user plane device and the control plane device are respectively located on different physical entities, when the at least one processor selects, from the at least two user plane devices, the user plane device whose data transmission capability satisfies the QoS required by the data transmission service, the at least one processor is configured to:
select, from the at least two user plane devices, a user plane device whose data transmission capability satisfies the QoS required by the data transmission service and that is located on a physical entity different from a physical entity on which the control plane device is located.

6. The control plane device according to claim 5, wherein:
the control plane device and the at least two user plane devices controlled by the control plane device are respectively located on different physical entities; or
the control plane device and at least one of the at least two user plane devices controlled by the control plane device are located on a same physical entity, and the control plane device and a user plane device other than the at least one user plane device are located on different physical entities.

* * * * *